(12) United States Patent
Zheng

(10) Patent No.: US 8,285,142 B2
(45) Date of Patent: Oct. 9, 2012

(54) AGGREGATION NODE DEVICE OF PASSIVE OPTICAL NETWORK AND PASSIVE OPTICAL NETWORK SYSTEM

(75) Inventor: Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 317 days.

(21) Appl. No.: 12/787,036

(22) Filed: May 25, 2010

(65) Prior Publication Data

US 2010/0232794 A1    Sep. 16, 2010

Related U.S. Application Data

(63) Continuation of application No. PCT/CN2008/073488, filed on Dec. 12, 2008.

(30) Foreign Application Priority Data

Dec. 13, 2007 (CN) .......................... 2007 1 0195358

(51) Int. Cl.
*H04J 14/00* (2006.01)
(52) U.S. Cl. ............................... 398/67; 398/68; 398/71
(58) Field of Classification Search .................... 398/58, 398/66–68, 70–72, 74, 75
See application file for complete search history.

(56) References Cited

U.S. PATENT DOCUMENTS

| 2003/0007212 | A1 | 1/2003 | Sala et al. |
| 2004/0120315 | A1 | 6/2004 | Han et al. |
| 2007/0201872 | A1 | 8/2007 | Yim et al. |
| 2008/0069564 | A1* | 3/2008 | Bernard ........................ 398/72 |
| 2008/0232804 | A1* | 9/2008 | Absillis ........................ 398/71 |
| 2011/0038630 | A1* | 2/2011 | Takeuchi et al. .............. 398/58 |

FOREIGN PATENT DOCUMENTS

| CN | 1156365 A | 8/1997 |
| CN | 1547335 A | 11/2004 |
| CN | 1838548 A | 9/2006 |
| CN | 1855778 A | 11/2006 |
| CN | 101459656 B | 5/2012 |
| WO | WO 2006/104630 A1 | 10/2006 |
| WO | WO 2007/051488 A1 | 5/2007 |

OTHER PUBLICATIONS

Extended European Search Report issued in corresponding European Patent Application No. 08862086.9, mailed Dec. 16, 2010.
International Search Report issued in corresponding PCT Application No. PCT/CN2008/073488; mailed Mar. 19, 2009.
International Search Report issued in corresponding PCT Patent Application No. PCT/CN2008/073488, mailed Mar. 19, 2009.

* cited by examiner

*Primary Examiner* — Dalzid Singh
(74) *Attorney, Agent, or Firm* — Brinks Hofer Gilson & Lione

(57) ABSTRACT

An aggregation node device of a passive optical network (PON) is provided which includes an aggregation optical line terminal (OLT) and an aggregation optical network unit (ONU). The aggregation OLT is connected to a user-side ONU. The aggregation OLT aggregates service data transmitted by a user-side ONU and transmits the aggregated service data to the aggregation ONU. The aggregation ONU is adapted to transmit the received aggregated service data to a network-side OLT. A PON system is further provided. The device and system can not only support the conventional time division multiplexing (TDM) services but also support the services based on variable-length packets and the multicast service. Moreover, it is not necessary to build an equipment room and supply power for an intermediate optical distribution network (ODN) which greatly reduces the network construction and operation costs.

13 Claims, 14 Drawing Sheets

AGGREGATION NODE DEVICE OF PASSIVE OPTICAL NETWORK AND PASSIVE OPTICAL NETWORK SYSTEM

CROSS-REFERENCE TO RELATED APPLICATIONS

This application is a continuation of International Application No. PCT/CN 2008/073488, filed on Dec. 12, 2008, which claims priority to Chinese Patent Application No. 200710195358.4, filed on Dec. 13, 2007, both of which are hereby incorporated by reference in their entireties.

FIELD OF THE TECHNOLOGY

The present disclosure relates to passive optical network (PON) technologies, and more particularly to an aggregation node device of a PON and a PON system.

BACKGROUND OF THE DISCLOSURE

Fiber to The Home (FTTH) is the technical trend which has been continually pursued by people for the past twenty years but has not been popularized and developed on a large scale due to obstacles such as cost, technology, and requirements. In recent years, due to the development of PON technologies, only a simple optical branching device, as opposed to a node device, is required to be mounted at an optical branching point, allowing the FTTH network to become a research focus once more and potentially enter a rapid development stage. It is believed that, along with continuous emergence of new devices and new network construction plans, the FTTH network will be further developed in the coming years.

An optical access network (OAN), also referred to as FTTx network, with Fiber in the loop (FITL) as its formal name, provides various service interfaces to realize the positions of optical network units (ONUs) in the OAN for user integrated access. The OAN includes FTTH, Fiber to The Building (FTTB), Fiber to The Curb (FTTC), and the like. The FTTH is a final form of development of the OAN. Since the OAN has a high access bandwidth, the OAN can be used to provide a Triple Play service (transmitting voice, data, and video over one network line), thereby improving the user experience.

The OAN is mainly implemented by using the PON technologies. There are two mature PON technologies in the prior art. One is an Ethernet Passive Optical Network (EPON) technology that was proposed in 2001. In this technology, a system uses an Ethernet protocol, adopts a rate of 1.25 Gbit/s for uplink and downlink transmission, and can support Internet Protocol (IP) services with a high efficiency. That is, for the IP services, link layers between an optical line terminal (OLT) and the ONU adopt the Ethernet technology to communicate with each other through time-slot mapping and encapsulation, and an uplink and downlink symmetrical rate of 1.25 Gbit/s can be achieved. The other technology is a Gigabit Passive Optical Network (GPON) standard defined by the International Telecommunications Union (ITU) in January of 2003. Compared with the EPON, the GPON is more concerned with the capability of supporting multiple services such as time division multiplexing (TDM) and IP, a downlink rate of up to 2.5 Gbit/s, and the ability for uplink and downlink transmissions to adopt asymmetrical rates.

FIG. 1 is a schematic view of an architecture of the FTTx network in the prior art. As shown in FIG. 1, a home network, an OAN, and a service node function (SNF) are included.

An interface between the home network and the OAN is a user network interface (UNI), and an interface between the OAN and the SNF is a service node interface (SNI). The OAN mainly implements the access of the home network to a core network (CN) and is constituted by a series of transmission devices between the SNI and the UNI. For the FTTH, an optical network terminal (ONT) is connected to the OLT through an optical fiber, and the OLT serves as a termination point of the OAN. The OLT is connected to the SNF to realize service aggregation and delivery. For the FTTC, a network terminal (NT) is connected to the ONU through a copper cable, and the ONU is connected to the OLT through an optical fiber. For the FTTB, the NT is connected to the ONU through a copper cable, and the ONU is connected to the OLT through an optical fiber. The FTTB and the FTTC are different in distances by which the NT is connected to the ONU through the copper cable.

FIG. 2 is a schematic view of a reference network architecture of the OAN in the prior art. As shown in FIG. 2, a customer premises network (CPN), an OAN, and an SNF are included.

The CPN mainly includes a customer premises equipment (CPE) adapted to be connected to an adaptation function (AF) through a UNI. T is a reference point of the UNI. The UNI may be a digital subscriber line (DSL).

The OAN includes an AF, an ONU/ONT, an optical distribution network (ODN), and an OLT.

The AF, as an optional device in the OAN, may be an independent entity and is mainly responsible for providing mutual conversion between the ONU/ONT interface and the UNI. The ONU/ONT and the AF have a reference point (a) therebetween. The AF is adapted to convert the packet format from the UNI format to an interface (such as an Ethernet Link) format of the reference point (a) that can be connected to the ONU/ONT. The AF may be built into the ONU, thus the reference point (a) is not required. The AF may also be placed behind the OLT to perform the mutual conversion between the OLT interface and the SNI.

The ONU/ONT is adapted to provide a user-side interface for the OAN, to be connected to the ODN, and to convert a packet into a format (such as EPON encapsulation or GPON generic framing encapsulation) that can be transmitted on the ODN.

The ODN is adapted to provide a transmission means for the OLT and the ONU/ONT and is constituted by a passive physical device, an optical fiber, and an optical splitter or coupler for realizing downlink and uplink transmission of optical services.

The OLT is adapted to provide network interfaces for the ODN, be connected to one or more ODNs, and convert a packet into a packet format of the SNI (for example, the Ethernet link) for accessing the SNF. V is a reference point of the SNI. The downlink service is from the OLT to the ODN and then to the ONU, and the uplink service is from the ONU to the OLT. In the downlink direction, the OLT sends an Ethernet frame to each ONU through N ODNs (N is generally 4-64), and the downlink transmission method is similar to a shared medium network. In the uplink direction, services sent by a plurality of ONUs are received through the ODN and aggregated.

The SNF is adapted to interact with the OLT through an ETH-based aggregation network.

FIG. 3 is a schematic view of an architecture of an ETH-based aggregation network in the prior art. As shown in FIG. 3, the OLT is an ETH-based aggregation node device, and an ETH-based aggregation network exists between the OLT and an IP network edge node device such as a broadband network gateway/broadband remote access server (BNG/BRAS). The OLT interacts with an IP network through the ETH-based aggregation network. The IP network edge node device is one part of the SNF. In addition, an access node (AN) such as a DSL access multiplexer (DSLAM) and the ONU/ONT can form a PON-fed AN. In FIG. 3, the PON-fed AN is a PON-fed DSLAM.

In the prior art, since the PON technology is connection-oriented and the ETH technology is connectionless, the connection-oriented PON-based network and the connectionless ETH-based aggregation network have poor coordination. Furthermore, the ETH-based aggregation network does not have strict quality of service (QoS) mechanism and operation, administration and maintenance (OAM) mechanism, and thus cannot support some services, especially the TDM or session-based services. In order to solve this problem, various ETH-based aggregation networks simulating connection characteristics are adopted in the prior art.

For example, at present, an ETH-based aggregation network based on a Provider Backbone Transport (PBT) technology is proposed for connection simulation. Connection management and configuration functions for the PBT network are newly added, and medium access control (MAC) address learning and spanning tree protocol as well as broadcast and multicast functions of unknown packets are disabled in PBT virtual local area network (VLAN). However, the Ethernet loses some original excellent properties, and the user experience is degraded at the same time. Furthermore, due to the technical enhancement, the complexity of the ETH variant is greatly increased, which does not conform to the properties of the ETH.

Further, at present, a multi-protocol label switching (MPLS)-based aggregation network is also proposed to support connection. However, another problem arises in that the MPLS does not support the multicasting function and so the user experience is degraded.

Moreover, the ETH-based aggregation network is an active network and must be rented to build equipment rooms, and battery cells and uninterrupted power systems (UPSs) must be configured for all aggregation network node devices between the OLT and the IP network edge node, resulting in high network construction and operation costs.

SUMMARY OF THE DISCLOSURE

The present disclosure is directed to an aggregation node device of a PON which is adapted to construct a connection-oriented PON-based aggregation network, thereby reducing the network complexity and improving the user experience.

An embodiment of the present disclosure provides an aggregation node device of a PON which includes an aggregation OLT and an aggregation ONU.

The aggregation OLT is connected to a user-side ONU, aggregates service data from the user-side ONU, and transmits the aggregated service data to the aggregation ONU.

The aggregation ONU is adapted to transmit the received aggregated service data to a network-side OLT.

An embodiment of the present disclosure further provides a PON system which includes a user-side ONU, an aggregation node device, and a network-side OLT.

The user-side ONU is adapted to transmit service data transmitted by a CPE to the aggregation node device.

The aggregation node device is adapted to aggregate the service data transmitted by the user-side ONU.

The network-side OLT is adapted to re-aggregate service data from more than one aggregation node device.

An embodiment of the present disclosure further provides a method for transmitting data in a PON system which includes the following steps.

An aggregation node device receives service data from a CPE forwarded by a user-side ONU.

The aggregation node device aggregates the received service data, and transmits the aggregated service data to a network-side OLT for re-aggregation.

It can be seen from the above technical solutions that, with the aggregation node device of the PON and the PON system of the present disclosure, a connection-oriented PON-based aggregation network can be constructed by using a PON cascading technology in order to improve on the poor coordination between the connection-oriented PON and the connectionless ETH in the prior art. The connection-oriented PON-based aggregation network has a perfect QoS mechanism, connection management and configuration functions, and can support both the conventional TDM services and services based on variable-length packets. Furthermore, since the PON technology is a point-to-multipoint technology based on shared media, the disadvantage that the MPLS-based aggregation network does not support multicasting is avoided. In addition, due to the passive properties of the PON, the aggregation network is changed from the ETH active network to the PON passive network, and it is not necessary to build an equipment room and supply power for an intermediate ODN, thereby greatly reducing the network construction and operation costs.

BRIEF DESCRIPTION OF THE DRAWINGS

The present disclosure will become more fully understood from the detailed description given herein below for illustration only by referring to the accompanying drawings among which.

DETAILED DESCRIPTION OF THE EMBODIMENTS

To make the objectives, technical solutions, and advantages of the present disclosure more comprehensible, the embodiments of the present disclosure are further described below in detail with reference to the accompanying drawings.

In the present disclosure, a connection-oriented PON-based aggregation network is constructed by using a PON cascading technology. An embodiment of the present disclosure provides an aggregation node device of a PON, which includes an aggregation OLT and an aggregation ONU.

The aggregation OLT is connected to a user-side ONU, aggregates service data from the user-side ONU, and transmits the aggregated service data to the aggregation ONU.

The aggregation ONU is adapted to transmit the received aggregated service data to a network-side OLT.

An embodiment of the present disclosure further provides a PON system, which includes a user-side ONU, an aggregation node device, and a network-side OLT.

The user-side ONU is adapted to transmit service data transmitted by a CPE to the aggregation node device.

The aggregation node device is adapted to aggregate the service data transmitted by the user-side ONU.

The network-side OLT is adapted to re-aggregate service data from more than one aggregation node device.

The aggregation node device includes an aggregation OLT and an aggregation ONU.

The aggregation OLT is connected to the user-side ONU, aggregates the service data transmitted by the user-side ONU, and transmits the aggregated service data to the aggregation ONU.

The aggregation ONU is adapted to transmit the received aggregated service data to the network-side OLT.

Figure 1:
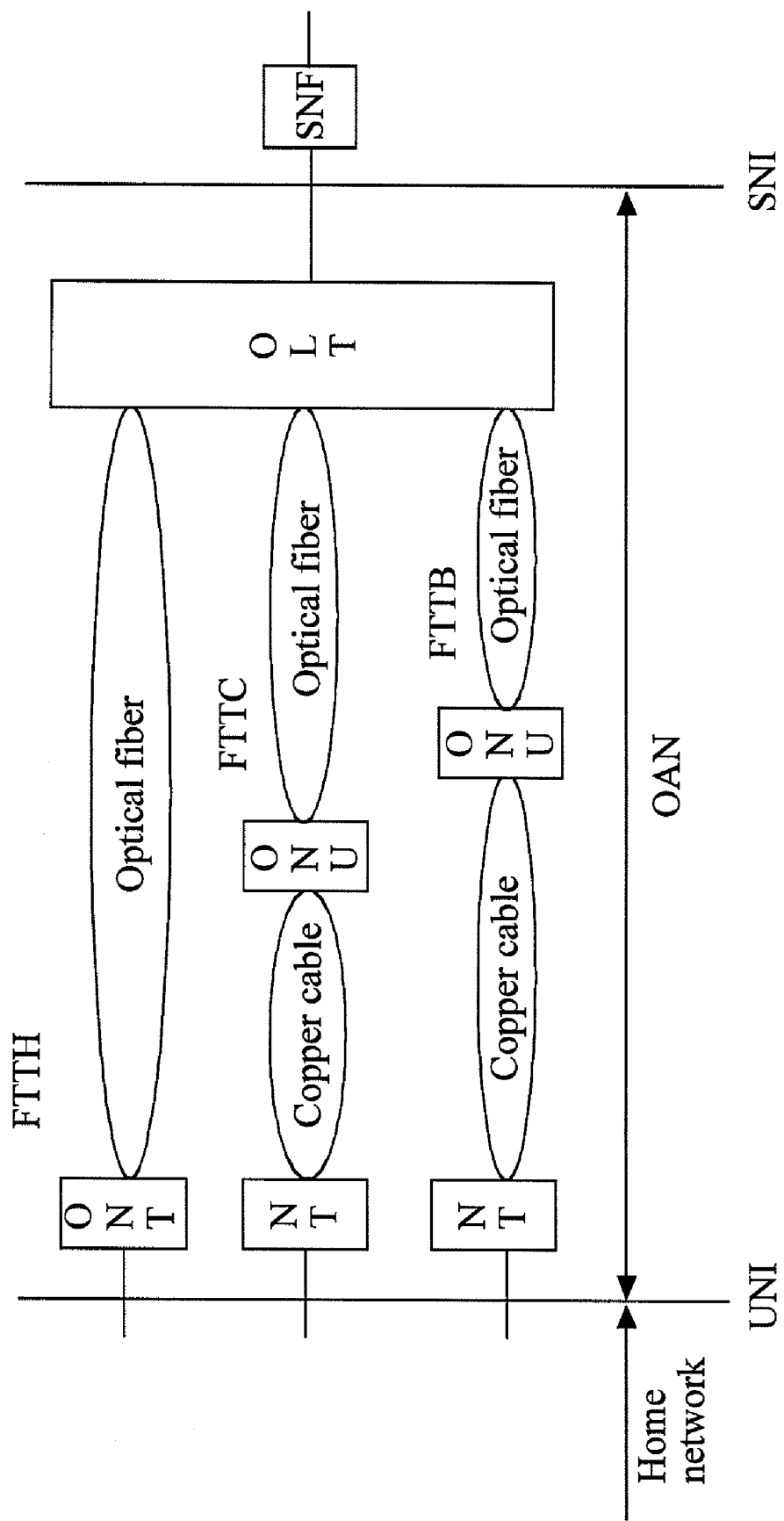
FIG. 1 is a schematic view of an architecture of the FTTx network in the prior art.
Figure 2:
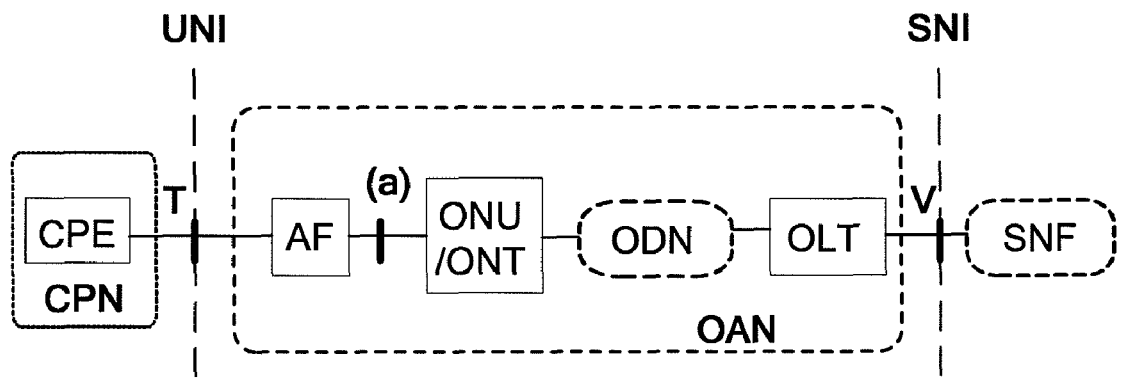
FIG. 2 is a schematic view of a reference network architecture of the OAN in the prior art.
Figure 3:
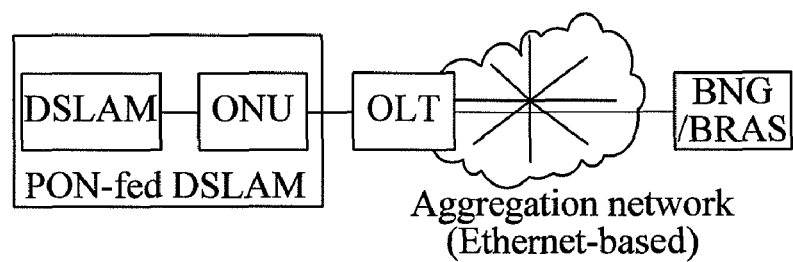
FIG. 3 is a schematic view of an architecture of an ETH-based aggregation network in the prior art.
Figure 4:
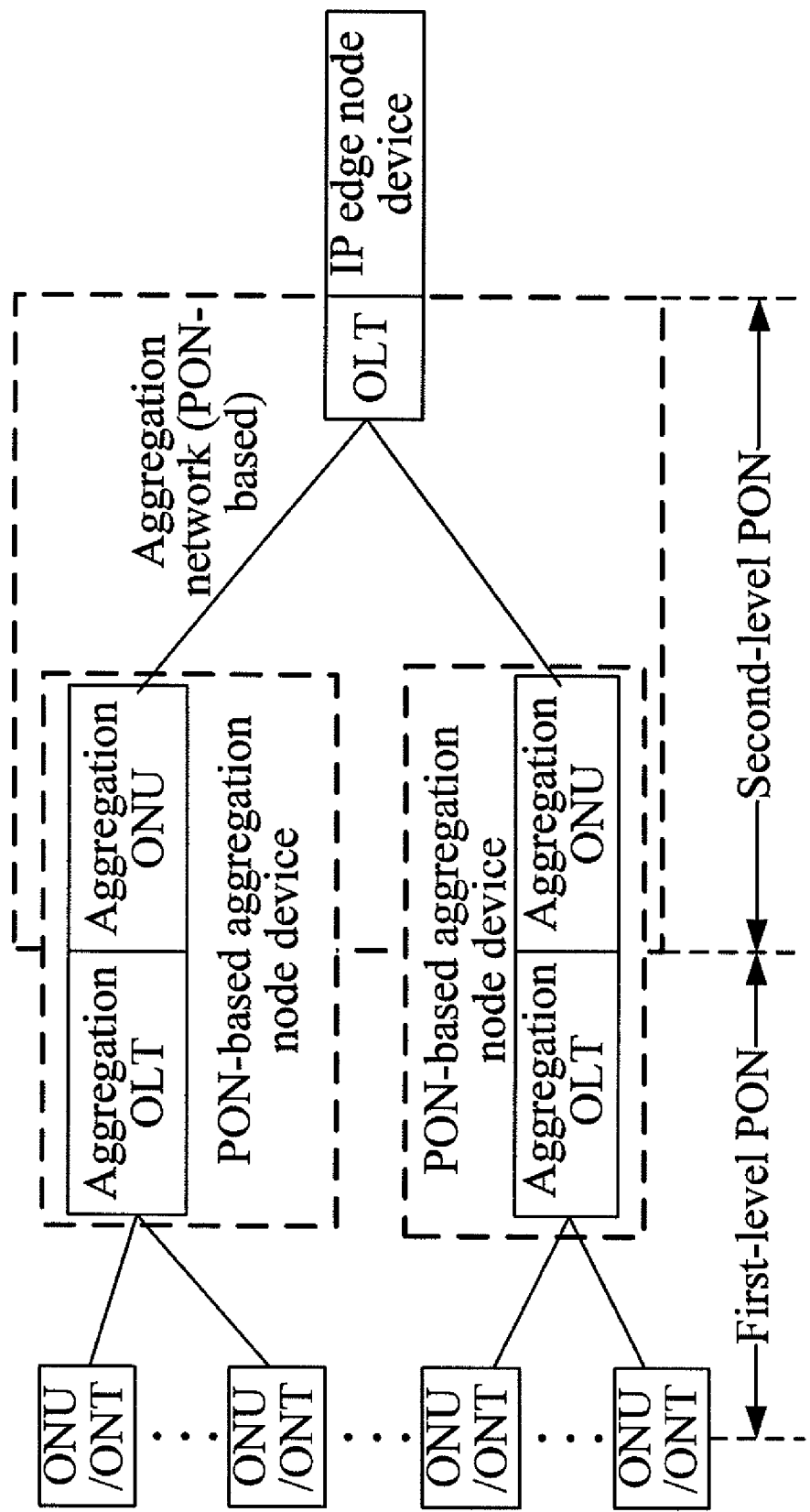
FIG. 4 is a schematic structural view of a cascaded PON-based aggregation network according to an embodiment of the present disclosure.

FIG. 4 is a schematic structural view of a cascaded PON-based aggregation network according to an embodiment of the present disclosure. In this embodiment, two levels of PONs are taken as an example. Referring to FIG. 4, the aggregation network includes a first-level PON, a second-level PON, and an IP edge node device (in some embodiments, the IP edge node device may not belong to the aggregation network).

The first-level PON is adapted to provide a user-side interface for an OAN and includes ONUs and aggregation OLTs. The ONUs are adapted to transmit services transmitted by a CPE to the aggregation OLTs, receive services transmitted by the aggregation OLTs, and transmit the services to the CPE. One aggregation OLT may be connected to a plurality of ONUs, aggregate services transmitted by the plurality of ONUs, receive a service transmitted by the second-level PON, and deliver the service to the ONUs. The aggregation OLT and the aggregation ONU are aggregation node devices. The ONU attached to the aggregation OLT is near the user side, and thus referred to as a user-side ONU, and the OLT in the upper level of the aggregation ONU is near a central network of a central office end and thus referred to as a network-side OLT (similarly hereinafter).

The ONU at the CPE side further includes an ONT.

The second-level PON, as an aggregation network of the first-level PON, includes aggregation ONUs and aggregation OLTs, and one aggregation OLT may be connected to a plurality of aggregation ONUs.

The aggregation OLTs of the first-level PON are connected to the aggregation ONUs of the second-level PON.

The IP edge node device is adapted to be connected to the aggregation OLT of the second-level PON and an IP network for data transmission.

In practical application, the OAN can adopt multiple levels of cascaded PONs (that is, ONU/ONT+ODN+OLT), for example, the first level, the second level, . . . , the Nth level. In this embodiment of the present disclosure, for the multiple levels of cascaded PONs, an upper level and a lower level are used to respectively represent the (N−1)th level and the Nth level. For the upper and lower levels in the same expression, the lower level (the (N−1)th level) represents the PON at the CPE side, and the upper level (the Nth level) represents the PON at the network side. The lower-level aggregation OLT (such as the aggregation OLT in the first level) and the upper-level aggregation ONU (such as the aggregation ONU in the second level) are connected, or the lower-level aggregation OLT and the upper-level aggregation ONU physically constitute the same device, thereby constituting a PON-based aggregation node device.

The cascaded upper-level and lower-level PONS may adopt different PON technologies, for example, the lower-level PON may adopt an EPON/GPON technology, and the upper-level PON may adopt a wavelength division multiplexing (WDM) PON technology in order to support the aggregating function.

The OLT/ONU/ONT at each level may have a built-in aggregating function and constitute a PON-fed aggregation node, and the last-level OLT and the IP edge node device are connected or physically constitute the same device, thereby constituting a PON-based edge node device.

Figure 5:
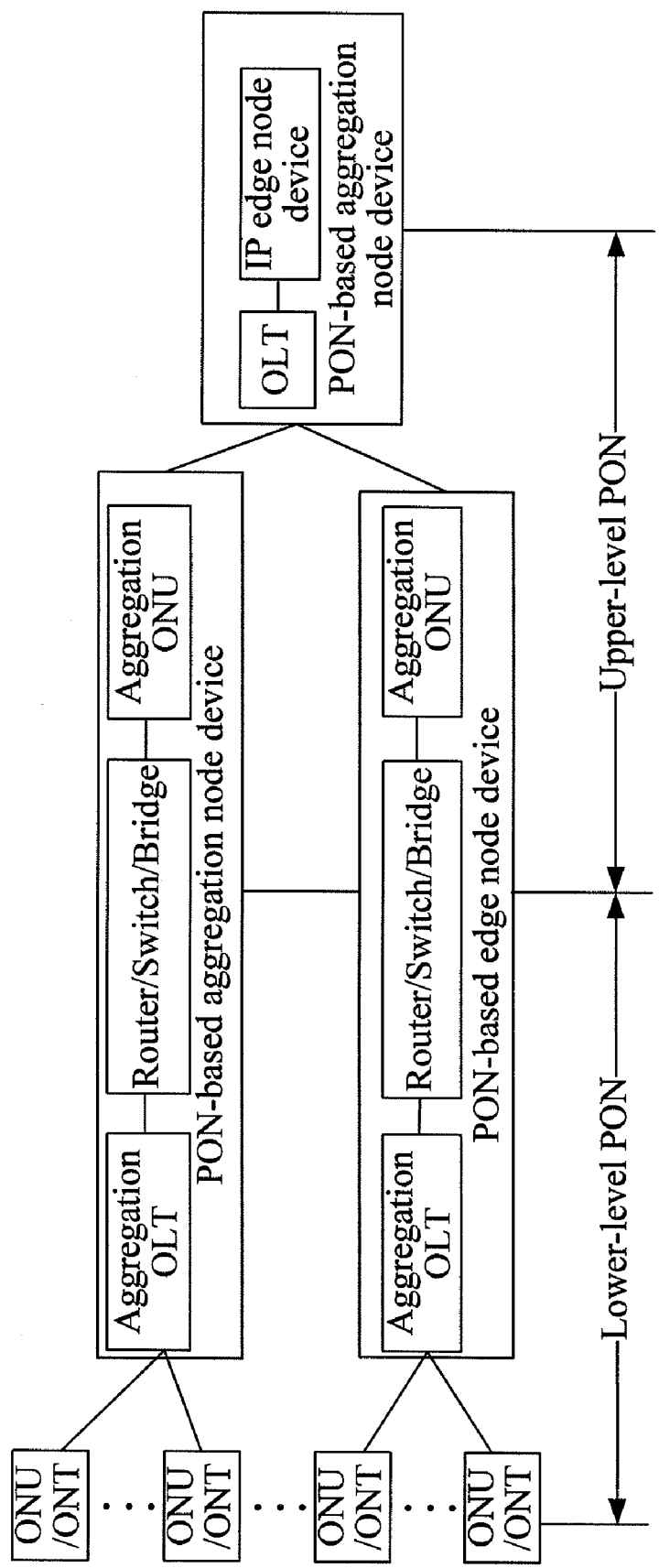
FIG. 5 is a second schematic structural view of a cascaded PON-based aggregation network according to an embodiment of the present disclosure.

FIG. 5 is a second schematic structural view of a cascaded PON-based aggregation network according to an embodiment of the present disclosure. Referring to FIG. 5, the PON-based aggregation node device further includes a router/switch/bridge functional unit which is adapted to be connected to the aggregation OLT of the lower-level PON and the aggregation ONU of the upper-level PON, respectively. The PON-based aggregation node devices may be interconnected.

The aggregation OLT of the lower-level PON is adapted to be connected to the ONU of the lower-level PON by the PON technology and may terminate transmission of the lower-level PON.

The aggregation ONU of the upper-level PON is adapted to be connected to the OLT of the upper-level PON by the PON technology and to terminate transmission of the upper-level PON.

The router/switch/bridge functional unit is adapted to interconnect the lower-level PON and the upper-level PON, thereby realizing routing, packet switching, or packet bridging. The unit may be independent of the aggregation OLT of the lower-level PON and the aggregation ONU of the upper-level PON or integrated into the OLT of the lower-level PON and the ONU of the upper-level PON.

In practical application, the router/switch/bridge functional unit may also support the aggregation function and support interconnection of PON-based aggregation node devices.

Figure 6A:
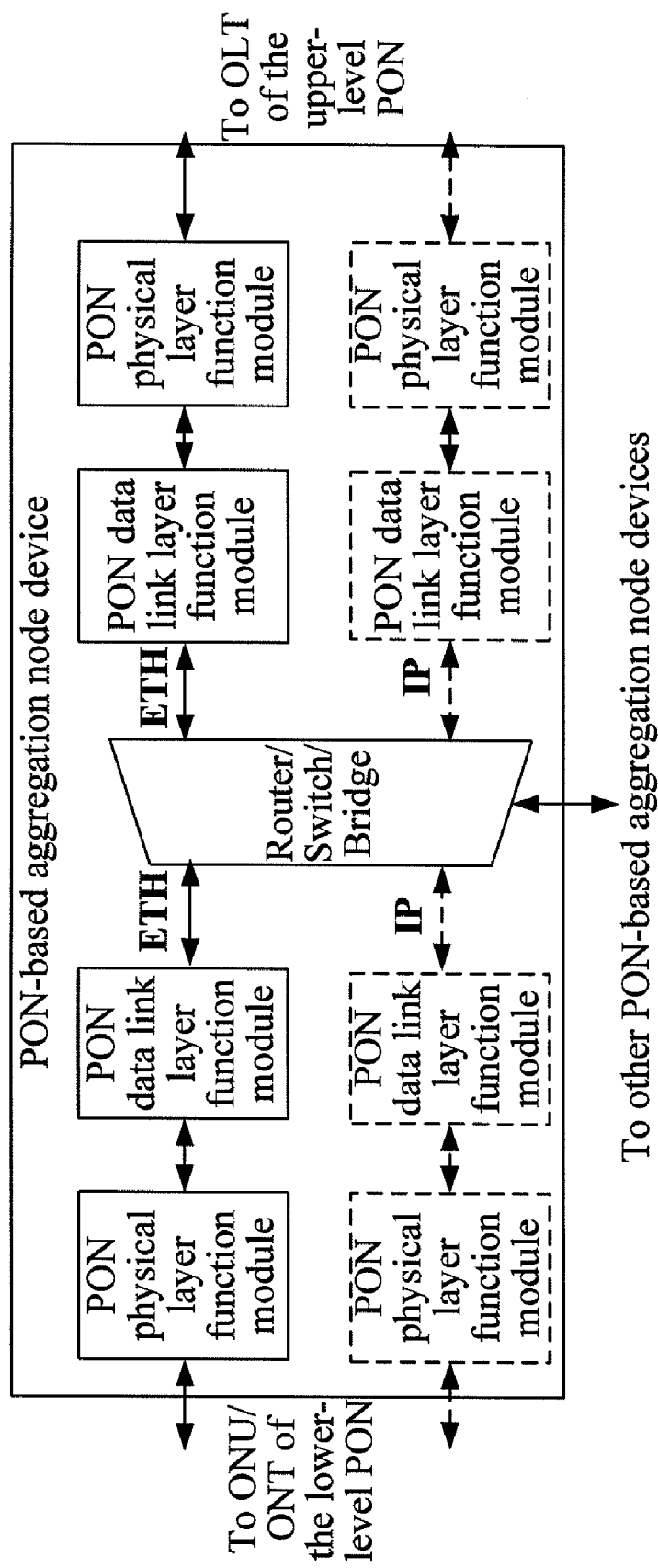
FIG. 6a is a schematic structural view of a PON-based aggregation node device based on FIG. 5 according to an embodiment of the present disclosure.

FIG. 6a is a schematic structural view of a PON-based aggregation node device based on FIG. 5 according to an embodiment of the present disclosure. Referring to FIG. 6a, an aggregation OLT, a router/switch/bridge functional unit, and an aggregation ONU are included.

The aggregation OLT includes a PON data link layer function module and a PON physical layer function module.

The PON data link layer function module is adapted to perform a PON data link layer function in a PON protocol stack.

The PON physical layer function module is adapted to perform a PON physical media layer function in the PON protocol stack.

The router/switch/bridge functional unit interconnects the lower-level PON and the upper-level PON through IP packets or Ethernet frames for routing, packet switching, or packet bridging, and may support the aggregation function as well as the interconnection of PON-based aggregation node devices through IP packets or Ethernet frames.

The aggregation ONU includes a PON data link layer function module and a PON physical layer function module and performs the same functions as the PON data link layer function module and the PON physical layer in the aggregation OLT.

Figure 6B:
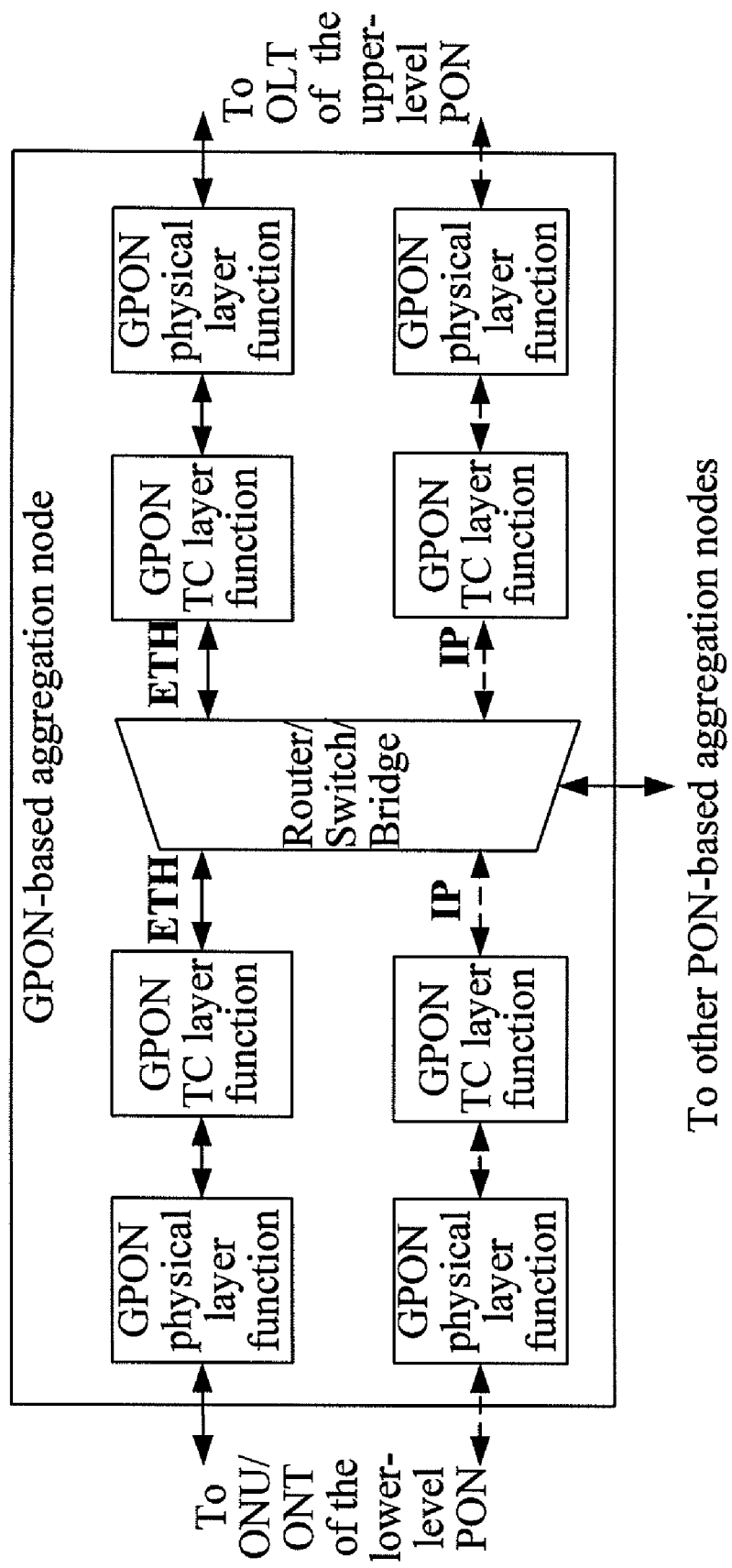
FIG. 6b is a first schematic structural view of a PON-based aggregation node device based on FIG. 6a according to an embodiment of the present disclosure.

FIG. 6b is a first schematic structural view of a PON-based aggregation node device based on FIG. 6a according to an embodiment of the present disclosure. Referring to FIG. 6b, this embodiment is directed to a GPON, and the PON data link layer function module is a GPON transmission convergence (TC) layer function module adapted to realize PON transmission convergence in the PON protocol stack, perform GEM encapsulation or decapsulation of Ethernet packets for an ETH over GPON Encapsulation Method (ETH over GEM) mode of the GPON, and perform GEM encapsulation or decapsulation of the IP packets for an IP over GEM mode of the GPON.

The corresponding PON physical layer function module is a GPON physical layer function module.

Figure 6C:
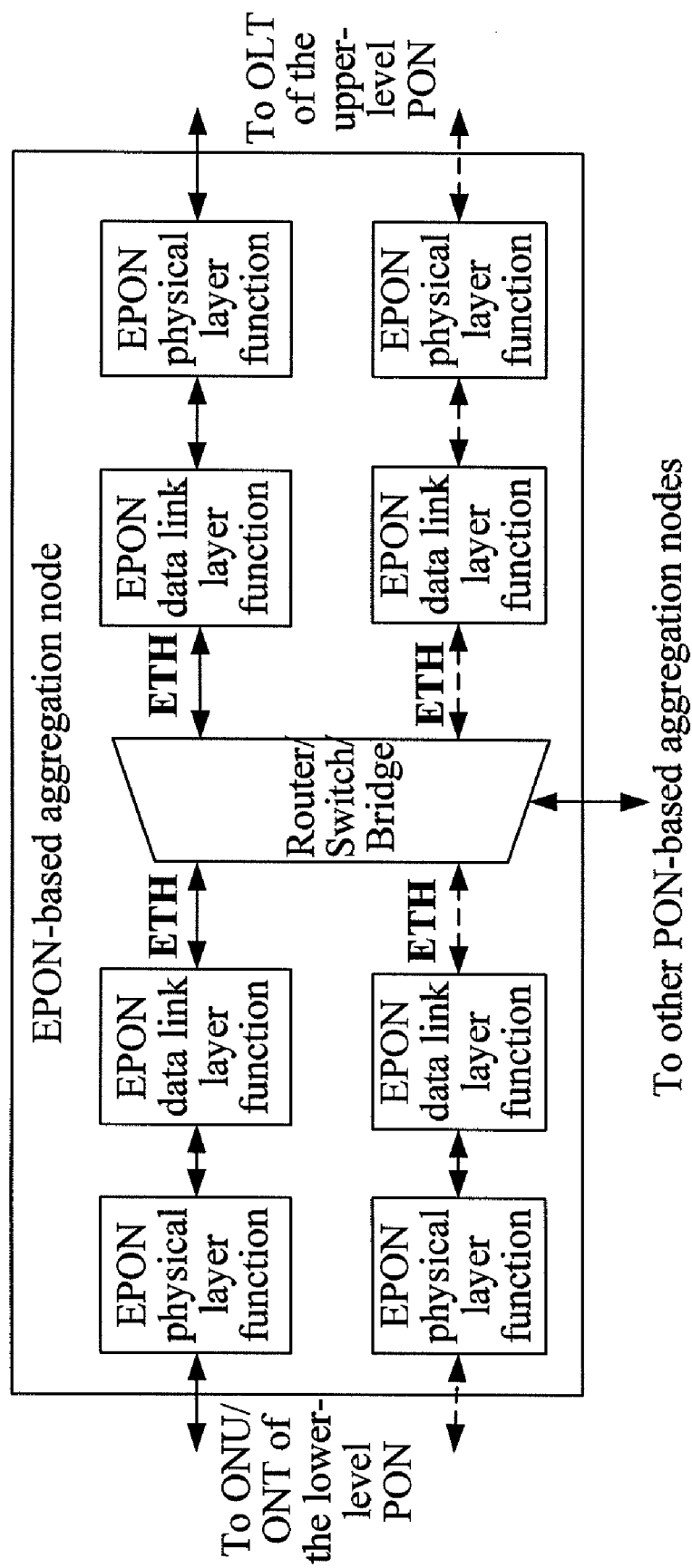
FIG. 6c is a second schematic structural view of a PON-based aggregation node device based on FIG. 6a according to an embodiment of the present disclosure.

FIG. 6c is a second schematic structural view of a PON-based aggregation node device based on FIG. 6a according to an embodiment of the present disclosure. Referring to FIG. 6c, this embodiment is directed to an EPON. The PON data link layer function module is an EPON data link layer function module, and correspondingly, the PON physical layer function module is an EPON physical layer function module.

In practical application, for a WDM PON, the PON data link layer function module is a WDM PON data link layer function module, and the corresponding PON physical layer function module is a WDM PON physical layer function module.

Figure 7:
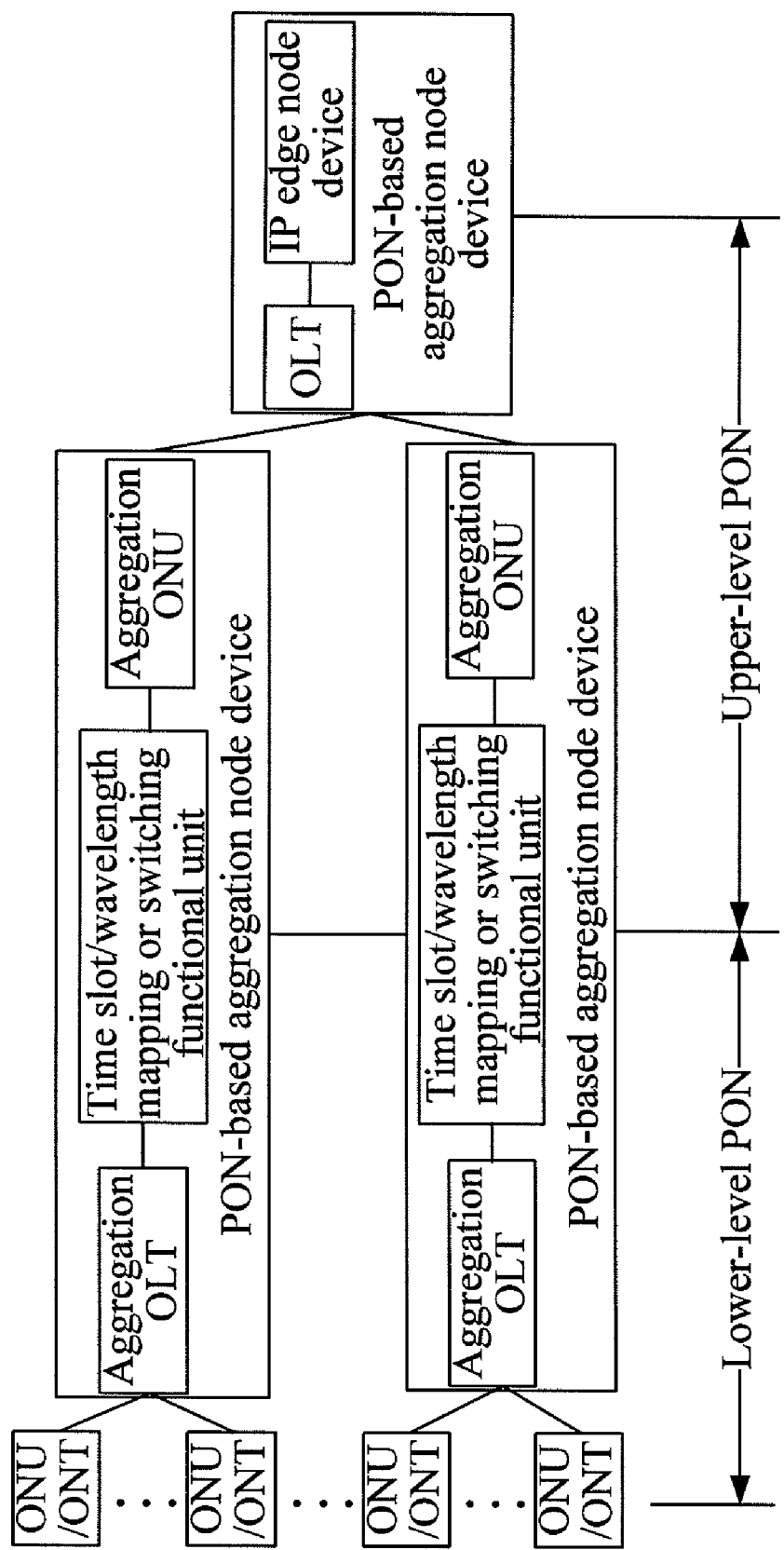
FIG. 7 is a third schematic structural view of a cascaded PON-based aggregation network according to an embodiment of the present disclosure.

FIG. 7 is a third schematic structural view of a cascaded PON-based aggregation network according to an embodiment of the present disclosure. Referring to FIG. 7, the PON-based aggregation node device further includes a time slot/wavelength mapping or switching functional unit, which is connected to the aggregation OLT of the lower-level PON and the aggregation ONU of the upper-level PON, respectively. The PON-based aggregation node devices may be interconnected.

The aggregation OLT of the lower-level PON is adapted to be connected to the ONU of the ONU of the lower-level PON by the PON technology and may or may not terminate transmission of the lower-level PON.

The aggregation ONU of the upper-level PON is adapted to be connected to the OLT of the upper-level PON by the PON technology and may or may not terminate transmission of the upper-level PON.

The time slot/wavelength mapping or switching functional unit is adapted to interconnect the lower-level PON and the upper-level PON and introduce a time slot/wavelength mapping (such as multiplex/demultiplex) or time slot/wavelength switching function between the upper-level and lower-level PONs and may support interconnection of PON-based aggregation node devices.

Figure 8A:
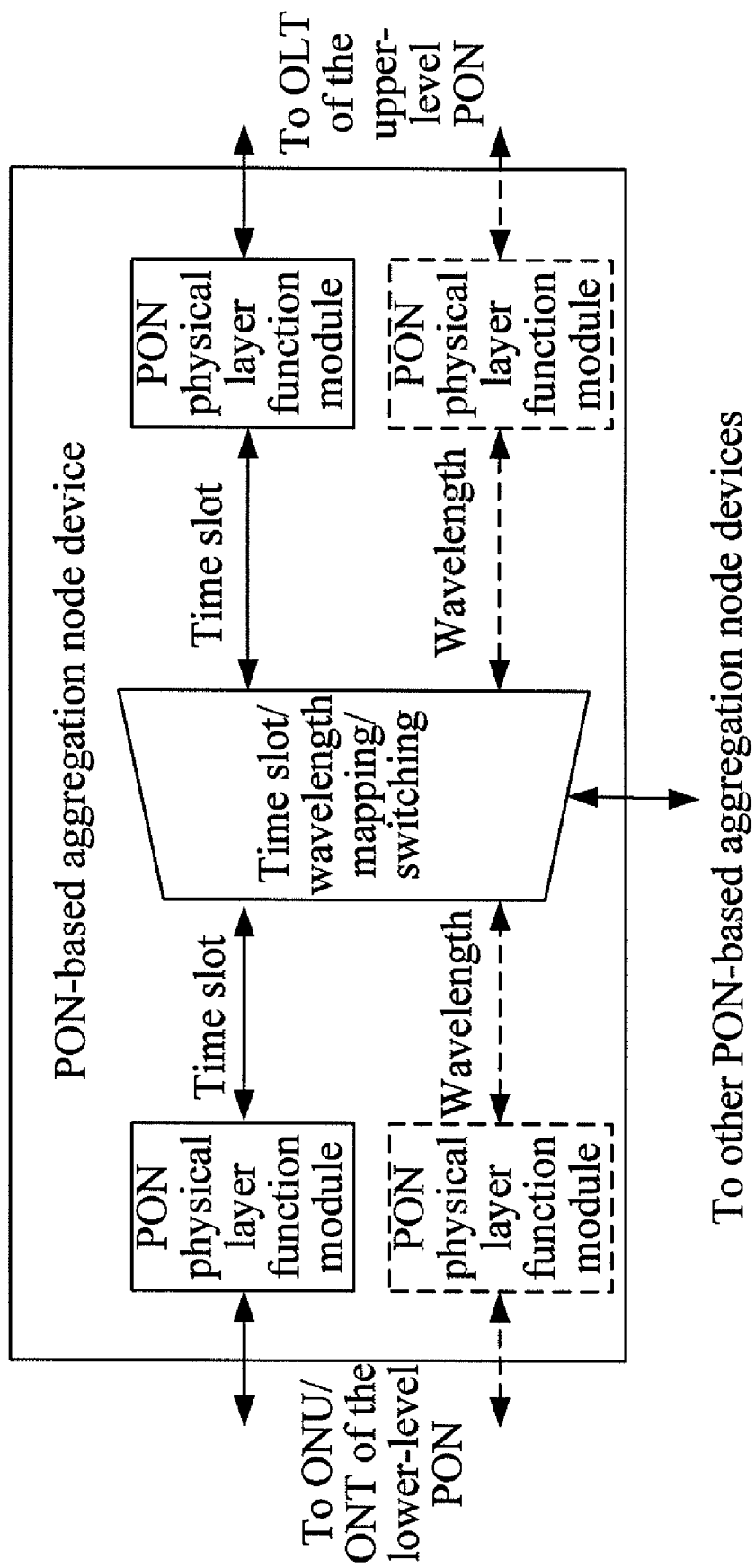
FIG. 8a is a schematic structural view of a PON-based aggregation node device based on FIG. 7 according to an embodiment of the present disclosure.

FIG. 8a is a schematic structural view of a PON-based aggregation node device based on FIG. 7 according to an embodiment of the present disclosure. Referring to FIG. 8a, an aggregation OLT, a time slot/wavelength mapping or switching functional unit, and an aggregation ONU are included.

The aggregation OLT includes a PON physical layer function module adapted to realize the PON physical media layer function in the PON protocol stack.

The time slot/wavelength mapping or switching functional unit is adapted to interconnect the lower-level PON and the upper-level PON by time slot or wavelength and introduce a time slot/wavelength mapping or time slot/wavelength switching function between the upper-level and lower-levels PONs and may support interconnection between the PON-based aggregation node devices by time slot/wavelength, for example, interconnection by an E1/T1/Synchronous Digital Hierarchy (SDH).

The aggregation ONU includes a PON physical layer function module which performs a function similar to that of the PON physical layer function module of the aggregation OLT.

Figure 8B:
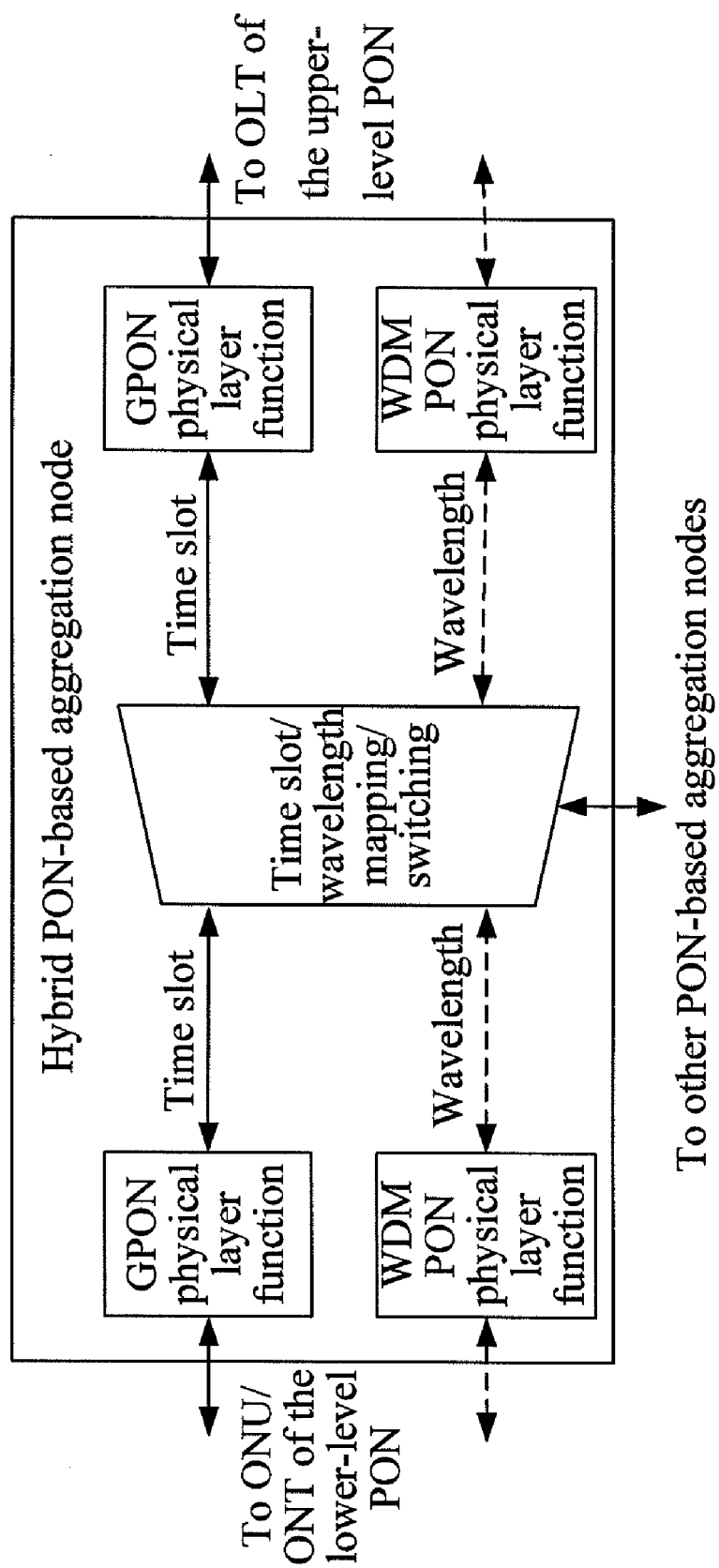
FIG. 8b is a second schematic structural view of a PON-based aggregation node device based on FIG. 7 according to an embodiment of the present disclosure.

FIG. 8b is a second schematic structural view of a PON-based aggregation node device based on FIG. 7 according to an embodiment of the present disclosure. Referring to FIG. 8b, this embodiment describes a hybrid PON-based aggregation node device which includes a GPON physical layer function module, a WDM PON physical layer function module, and a time slot/wavelength mapping or switching functional unit. The GPON physical layer function module and the WDM PON physical layer function module are connected to the time slot/wavelength mapping or switching functional unit, respectively.

In practical application, the aggregation OLT and the aggregation ONU may further include a PON data link layer function module.

Figure 9A:
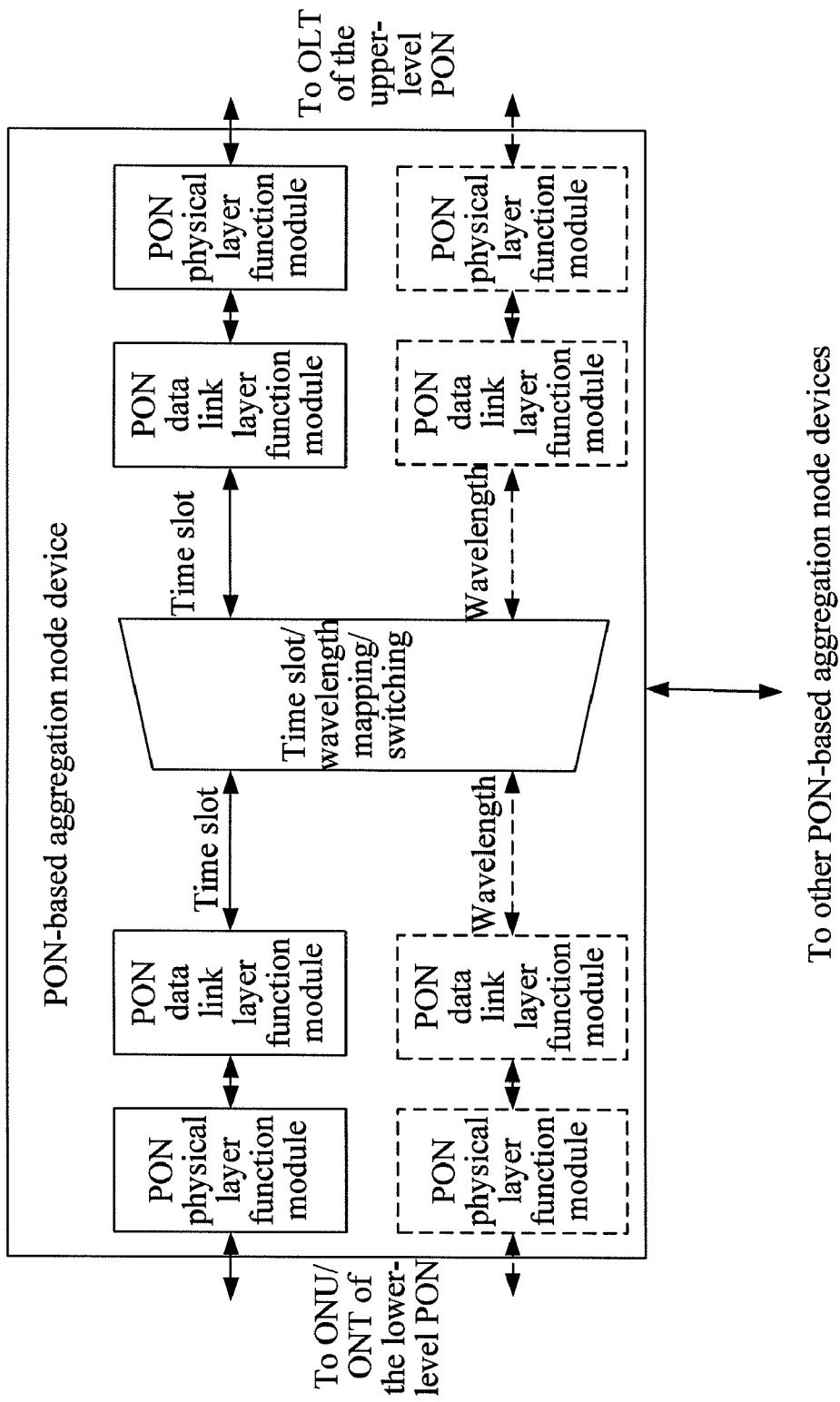
FIG. 9a is a third schematic structural view of a PON-based aggregation node device based on FIG. 7 according to an embodiment of the present disclosure.

FIG. 9a is a third schematic structural view of a PON-based aggregation node device based on FIG. 7 according to an embodiment of the present disclosure. Referring to FIG. 9a, the aggregation OLT and the aggregation ONU further include a PON data link layer function module.

The PON data link layer function module is adapted to perform the PON data link layer function in the PON protocol stack.

Figure 9B:
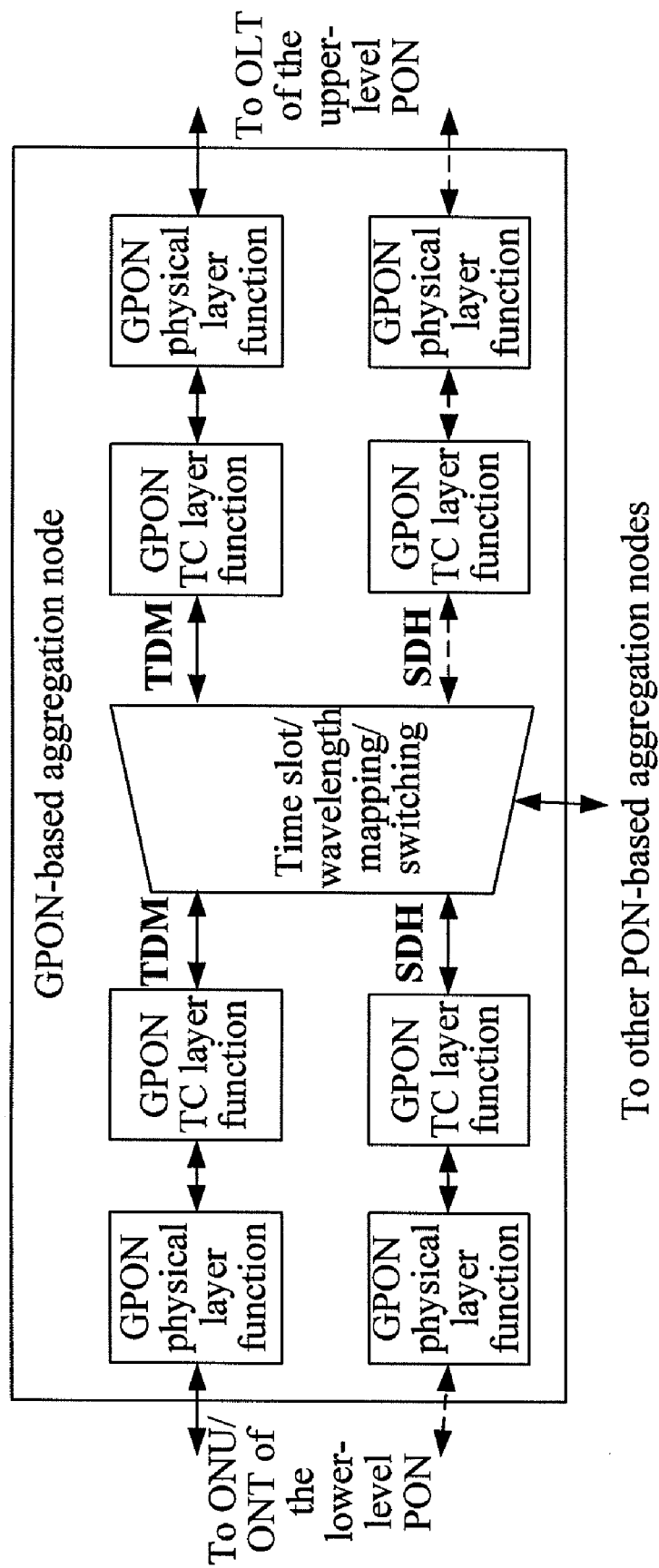
FIG. 9b is a schematic structural view of a PON-based aggregation node device based on FIG. 9a according to an embodiment of the present disclosure.

FIG. 9b is a schematic structural view of a PON-based aggregation node device based on FIG. 9a according to an embodiment of the present disclosure. Referring to FIG. 9b, this embodiment is directed to a GPON, and the PON data link layer function module is a GPON TC layer function module adapted to realize a PON TC layer function in a PON protocol stack, perform GEM encapsulation or decapsulation process of TDM frames for a TDM over GEM mode of the GPON, and perform GEM encapsulation or decapsulation process of SDH frames for an SDH over GEM mode of the GPON. The corresponding PON physical layer function module is a GPON physical layer function module.

Figure 9C:
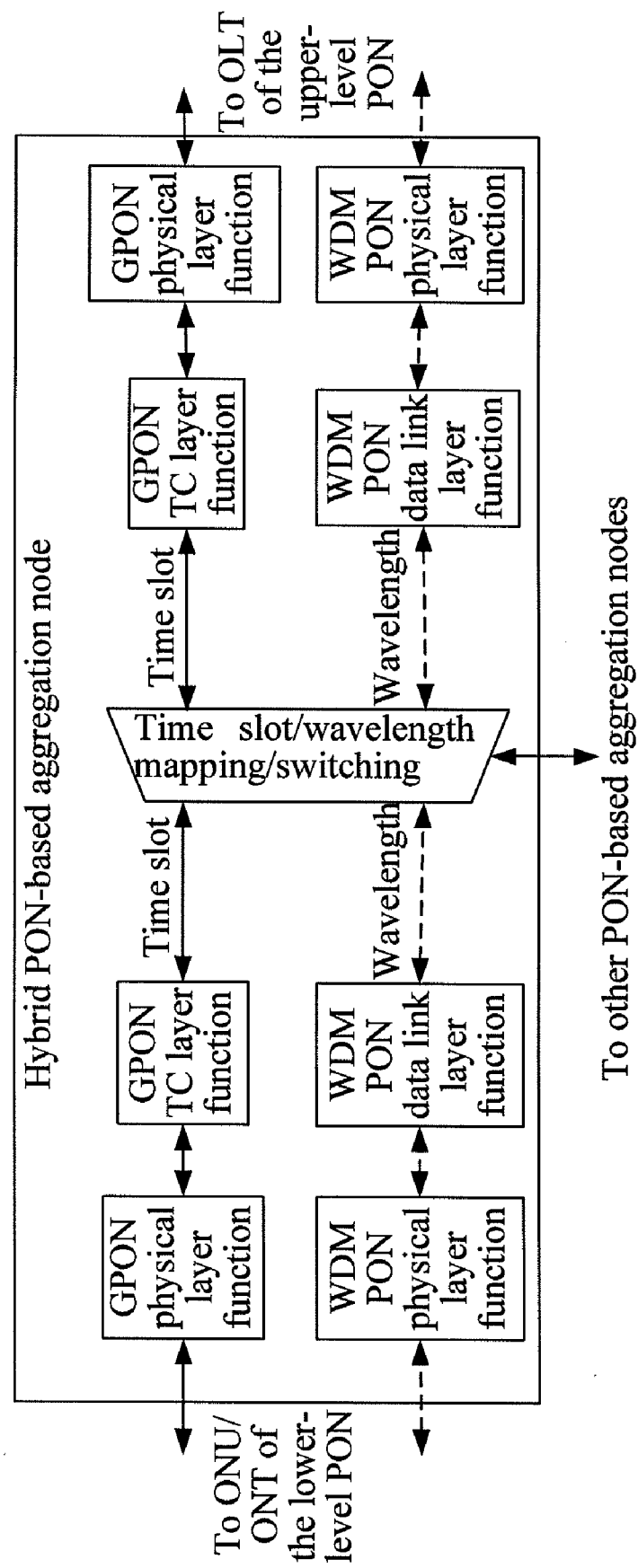
FIG. 9c is a second schematic structural view of a PON-based aggregation node device based on FIG. 9a according to an embodiment of the present disclosure.

FIG. 9c is a second schematic structural view of a PON-based aggregation node device based on FIG. 9a according to an embodiment of the present disclosure. Referring to FIG. 9c, this embodiment describes a hybrid PON-based aggregation node device which includes a GPON physical layer function module, a WDM PON physical layer function module, a GPON TC layer function module, a WDM PON data link layer function module, and a time slot/wavelength mapping or switching functional unit. That is, for an EPON, the PON data link layer function module is an EPON data link layer function module adapted to perform a PON data link layer function in an EPON protocol stack. For a WDM PON, the PON data link layer function module is a WDM PON data link layer function module adapted to perform a PON data link layer function in a WDM PON protocol stack. The GPON TC layer function module is connected to the GPON physical layer function module and the time slot/wavelength mapping or switching functional unit, respectively. The WDM PON data link layer function module is connected to the WDM PON physical layer function module and the time slot/wavelength mapping or switching functional unit, respectively.

In practical application, a BRAS serving as a conventional Internet service edge node may not be modified and is connected through the ETH-based aggregation network for connectionless services (such as Internet services). For multicasting services, a PON-based multicasting service edge node may be added, and a PON-based aggregation network may be introduced such that the OLT and the PON-based aggregation node device are connected through the PON-based aggregation network.

Figure 10:
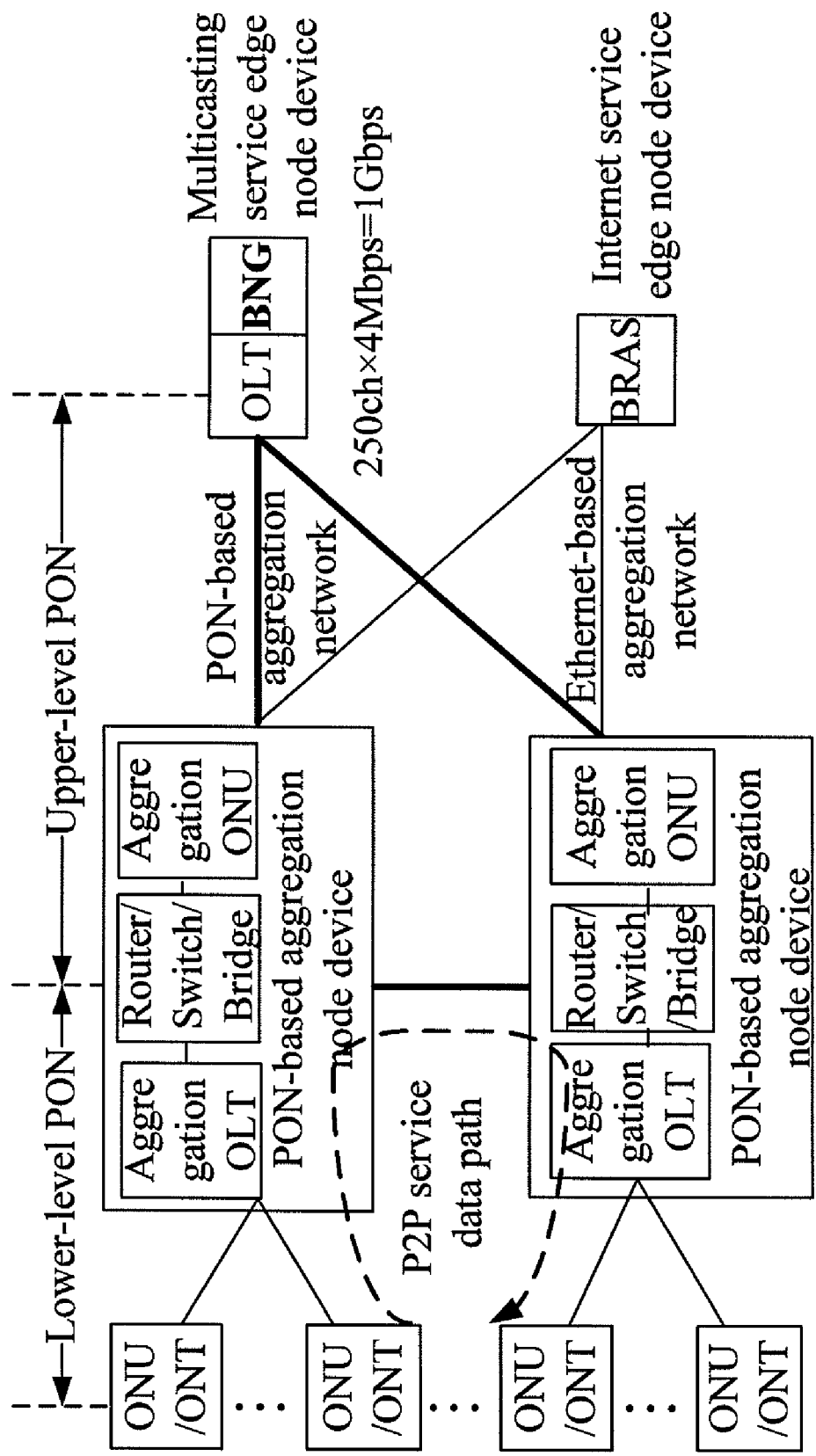
FIG. 10 is a schematic structural view of a hybrid PON/ETH aggregation network according to an embodiment of the present disclosure.

FIG. 10 is a schematic structural view of a hybrid PON/ETH aggregation network according to an embodiment of the present disclosure. Referring to FIG. 10, an ONU/ONT, a PON-based aggregation node device, a PON-based aggregation network, an ETH-based aggregation network, an OLT, a BNG, and a BRAS are included. The BNG and the BRAS constitute a service edge node device.

The PON-based aggregation node device may be connected to the BRAS through the ETH-based aggregation network and may also be connected to the aggregation OLT of the upper-level PON through the PON-based aggregation network.

The PON-based aggregation node device, the ETH-based aggregation network, and the BRAS are adapted for the conventional Internet services. The BRAS serving as a conventional Internet service edge node is not modified and is connected through the ETH-based aggregation network for connectionless services (such as Internet services).

The PON-based aggregation node device, the PON-based aggregation network, the OLT, and the BNG are adapted for multicasting services. That is, for the multicasting services, a PON-based multicasting service edge node device is added, and a PON-based aggregation network is introduced such that the OLT and the PON-based aggregation node device are connected through the PON-based aggregation network. If the multicasting channel of each IP Television (IPTV) is 4 Mbps, a PON bandwidth of 1 Gbps can support up to 250 multicasting channels.

For connection-oriented Voice over IP services, transmission may be implemented through the PON-based aggregation network. For example, for G.711 with the poorest coding efficiency, the bandwidth is required to be 64 k/user. If the PON-based aggregation node device can support 2 k users, the total bandwidth of 2 k*64 k=128 Mbps is required. It is feasible to add an edge node device supporting the Voice over IP services and introduce a PON-based aggregation network or combine the Voice over IP service edge node device and the multicasting service edge node device into one edge node device and use the same PON-based aggregation network.

For peer-to-peer (P2P) transmission, the bearer and control are separated. A P2P control signaling is processed at the service edge node device (such as BRAS/BNG), and the P2P data stream is locally switched directly between the PON-based aggregation node devices and is processed by the PON-based aggregation node devices. For cross-domain switching, direct transmission can be performed across ANs through the connection between the PON-based aggregation node devices.

For Video on Demand (VoD) services, the P2P-based technology or the Content Delivery Network (CDN) technology may be adopted. The P2P Video is processed in the same manner as the P2P service. If the CDN technology is adopted, a CDN proxy server is disposed at the PON-based aggregation node, and the video of a head-end server is deployed in the CDN proxy server in advance. Since the real-time synchronous data traffic is small, impacts on the PON-based aggregation network can be avoided.

An embodiment of the present disclosure further provides a method for transmitting data in a PON system, which includes the following steps.

An aggregation node device receives service data from a CPE forwarded by a user-side ONU.

The aggregation node device aggregates the received service data and transmits the aggregated service data to a network-side OLT for re-aggregation.

The aggregation node device includes an aggregation OLT and an aggregation ONU.

The aggregating, by the aggregation node device, of the received service data and transmitting the aggregated service data to the network-side OLT further includes the following specific steps.

The aggregation OLT aggregates the service data transmitted by the user-side ONU and transmits the aggregated service data to the aggregation ONU.

The aggregation ONU transmits the received aggregated service data to the network-side OLT.

It can be seen from the above embodiments that, with the aggregation node device of the PON and the PON system of the present disclosure, a PON-based aggregation node device and a connection-oriented PON-based aggregation network can be constructed by using a PON cascading technology in order to alleviate the poor coordination between the connection-oriented PON and the connectionless ETH in the prior art. The connection-oriented PON-based aggregation network has an improved QoS mechanism and connection management and configuration functions. The connection-oriented PON-based aggregation network can utilize the optical fault location technology and the OAM technology of the PON, and can support both the conventional TDM services and services based on variable-length packets. Furthermore, since the PON technology is a point-to-multipoint technology based on shared media and the PON-based aggregation network naturally supports multicasting, the disadvantage that the MPLS-based aggregation network does not support multicasting is avoided. The optical fault location technology and the OAM technology of the PON can be utilized to control, monitor, and detect the aggregation network. "IP+optic" is the development trend of the future OAN, and the GPON-based aggregation network can adopt an IP over GEM technology so that the high overhead of Ethernet packet headers can be reduced. In addition, due to the passive properties of the PON, the aggregation network is changed from the ETH active network to the PON passive network, and it is not necessary to build an equipment room and supply power for an intermediate ODN, thereby greatly reducing the network construction and operation costs. At the same time, the PON cascading technology can serve as a long reach PON technology, so as to solve the problem of long-distance optical transmission.

Although the objectives, technical solutions, and advantages of the present disclosure are further described in detail through preferred embodiments hereinabove, it should be understood that the above descriptions are merely preferred embodiments of the present disclosure, but not intended to limit the present disclosure, and any modification, equivalent replacement, and improvement made without departing from the spirit and principle of the present disclosure shall fall within the scope of the present disclosure.

What is claimed is:

1. An aggregation node device of a passive optical network (PON), comprising an aggregation optical line terminal (OLT) and an aggregation optical network unit (ONU), wherein
the aggregation OLT is connected to a user-side ONU, aggregates service data from the user-side ONU, and transmits the aggregated service data to the aggregation ONU; and
the aggregation ONU is adapted to transmit the received aggregated service data to a network-side OLT.

2. The device according to claim 1, wherein the aggregation ONU comprises a data link layer function module and a physical layer function module;
the data link layer function module is adapted to perform a PON data link layer function in a PON protocol stack; and
the physical layer function module is adapted to perform a PON physical media layer function in the PON protocol stack.

3. The device according to claim 2, wherein the data link layer function module is a Gigabit PON (GPON) transmission convergence (TC) layer function module, and the physical layer function module is a GPON physical layer function module,
the GPON TC layer function module is adapted to perform GPON Encapsulation Method (GEM) encapsulation or decapsulation of Ethernet packets for an ETH over GPON Encapsulation Method (ETH over GEM) mode; or perform GEM encapsulation or decapsulation of Internet Protocol (IP) packets for an IP over GEM mode; and
the GPON physical layer function module is adapted to perform a PON physical media layer function in the PON protocol stack.

4. The device according to claim 2, wherein the data link layer function module is an Ethernet data link layer function module, and the physical layer function module is an Ethernet physical layer function module.

5. The device according to claim 2, wherein the data link layer function module is a wavelength division multiplexing (WDM) PON data link layer function module, and the physical layer function module is a WDM PON physical layer function module.

6. The device according to claim 2, further comprising:
a switch functional unit, adapted to interconnect the aggregation OLT and the aggregation ONU, and perform packet switching between the aggregation OLT and the aggregation ONU.

7. The device according to claim 1, wherein the aggregation ONU comprises:
a PON physical layer function module, adapted to perform a PON physical media layer function in a PON protocol stack.

8. The device according to claim 7, wherein the aggregation ONU further comprises a GPON TC layer function module, adapted to perform GEM encapsulation or decapsulation of time division multiplexing (TDM) frames; or
perform GEM encapsulation or decapsulation of synchronous digital hierarchy (SDH) frames.

9. The device according to claim 7, wherein the aggregation ONU further comprises an Ethernet PON (EPON) data link layer function module, adapted to perform a PON data link layer function in an EPON protocol stack.

10. The device according to claim 7, wherein the aggregation ONU further comprises a WDM PON data link layer function module, adapted to perform a PON data link layer function in a WDM PON protocol stack.

11. The device according to claim 7, further comprising:
a mapping functional unit, adapted to be connected to the aggregation OLT and the aggregation ONU, and map a time slot or a wavelength between the aggregation OLT and the aggregation ONU.

12. A passive optical network (PON) system, comprising a user-side optical network unit (ONU), an aggregation node device, and a network-side optical line terminal (OLT), wherein
the user-side ONU is adapted to transmit service data transmitted by a customer premises equipment (CPE) to the aggregation node device;
the aggregation node device is adapted to aggregate the service data transmitted by the user-side ONU; and
the network-side OLT is adapted to re-aggregate service data from more than one aggregation node device;
wherein aggregation node device comprises an aggregation OLT and an aggregation ONU;
the aggregation OLT is , connected to the user-side ONU, aggregates the service data transmitted by the user-side ONU, and transmits the aggregated service data to the aggregation ONU; and
the aggregation ONU is adapted to transmit the received aggregated service data to the network-side OLT.

13. A method for transmitting data in a passive optical network (PON) system, comprising:
receiving, by an aggregation node device, service data from a customer premises equipment (CPE) forwarded by a user-side optical network unit (ONU); and
aggregating, by the aggregation node device, the received service data, and transmitting the aggregated service data to a network-side optical line terminal (OLT) for re-aggregation;
wherein the aggregation node device comprises an aggregation OLT and an aggregation ONU, and
the aggregating, by the aggregation node device, the received service data, and transmitting the aggregated service data to the network-side OLT further comprises:
aggregating, by the aggregation OLT, the service data transmitted by the user-side ONU and transmitting the aggregated service data to the aggregation ONU; and
transmitting, by the aggregation ONU, the received aggregated service data to the network-side OLT.

* * * * *